US010975486B2

(12) United States Patent
Millward et al.

(10) Patent No.: US 10,975,486 B2
(45) Date of Patent: *Apr. 13, 2021

(54) DUCT ASSEMBLY AND METHOD OF FORMING

(71) Applicant: Unison Industries, LLC, Jacksonville, FL (US)

(72) Inventors: David William Millward, Washington Township, OH (US); Gordon Tajiri, Waynesville, OH (US); Donald Lee Templeton, Beavercreek, OH (US); Emily Marie Phelps, Bellbrook, OH (US)

(73) Assignee: Unison Industries, LLC, Jacksonville, FL (US)

( * ) Notice: Subject to any disclaimer, the term of this patent is extended or adjusted under 35 U.S.C. 154(b) by 234 days.

This patent is subject to a terminal disclaimer.

(21) Appl. No.: 15/940,233

(22) Filed: Mar. 29, 2018

(65) Prior Publication Data

US 2019/0301035 A1 Oct. 3, 2019

(51) Int. Cl.
| | | |
|---|---|---|
| *C25D 1/02* | (2006.01) | |
| *B33Y 80/00* | (2015.01) | |
| *C25D 1/10* | (2006.01) | |
| *F02C 3/06* | (2006.01) | |
| *F02C 9/18* | (2006.01) | |
| *F02C 7/18* | (2006.01) | |

(52) U.S. Cl.
CPC .................. *C25D 1/02* (2013.01); *C25D 1/10* (2013.01); *F02C 3/06* (2013.01); *F02C 9/18* (2013.01); *B33Y 80/00* (2014.12); *F02C 7/18* (2013.01); *F05D 2220/323* (2013.01); *F05D 2230/31* (2013.01); *F05D 2260/606* (2013.01)

(58) Field of Classification Search
CPC ... C25D 1/00; C25D 1/02; C25D 1/10; C25D 5/56; F02C 3/06; F02C 9/18; F02C 7/18; F02C 7/00; F05D 2260/606; F05D 2220/323; F05D 2230/31; F05D 2230/30; F05D 2230/54; F01D 25/00; F01D 25/24; F01D 25/30
See application file for complete search history.

(56) References Cited

U.S. PATENT DOCUMENTS

| | | |
|---|---|---|
| 314,528 A | 3/1885 | Hardy |
| 315,628 A | 4/1885 | Jacobsen |
| 315,681 A | 4/1885 | Von Hollen |
| 316,569 A | 4/1885 | Reynolds |
| 317,921 A | 5/1885 | Brown |
| 318,604 A | 5/1885 | Devereux |
| 320,600 A | 6/1885 | Stoetzel |

(Continued)

FOREIGN PATENT DOCUMENTS

| | | |
|---|---|---|
| EP | 1336810 A2 | 8/2003 |
| FR | 2331690 A1 | 6/1977 |

(Continued)

*Primary Examiner* — Lee A Holly
(74) *Attorney, Agent, or Firm* — McGarry Bair PC (57) ABSTRACT

A method of forming a tubular element includes providing an attachment joint, and disposing a mandrel adjacent the attachment joint, where the mandrel can also include an outer or exposed surface. Metal can be disposed on the outer surface of the mandrel to form at least a portion of the tubular element.

20 Claims, 10 Drawing Sheets

(56) References Cited

U.S. PATENT DOCUMENTS

| | | | |
|---|---|---|---|
| 691,803 A | 1/1902 | Patton |
| 1,282,269 A | 10/1918 | Merritt |
| 1,694,962 A | 12/1928 | Berry |
| 2,181,257 A | 11/1939 | Arbogast |
| 2,287,122 A | 6/1942 | Norris |
| 2,761,828 A | 9/1956 | Ginzton |
| 3,022,230 A | 2/1962 | Fialkoff |
| 3,308,879 A | 3/1967 | Maddocks |
| 3,554,874 A | 1/1971 | Mattia |
| 3,910,039 A | 10/1975 | Fortini |
| 4,156,306 A | 5/1979 | Seidel |
| 4,214,945 A | 7/1980 | Lucas |
| 4,255,237 A | 3/1981 | Obert |
| 4,417,854 A | 11/1983 | Cain |
| 5,293,922 A | 3/1994 | Sayama |
| 5,698,086 A | 12/1997 | Herbert |
| 6,582,542 B1 | 6/2003 | Russell |
| 6,904,756 B2 | 6/2005 | Mack |
| 7,712,789 B2 | 5/2010 | Heuer |
| 8,636,485 B2 | 1/2014 | Steele |
| 9,284,654 B2 | 3/2016 | Saucy |
| 9,365,941 B2 | 6/2016 | Saucy |
| 9,624,779 B2 | 4/2017 | Yan |
| 2011/0062112 A1 | 3/2011 | Saucy |
| 2014/0202170 A1 | 7/2014 | Cook, III |
| 2015/0096631 A1 | 4/2015 | Regan |
| 2016/0003257 A1 | 1/2016 | Lorenzo |
| 2016/0281532 A1 | 9/2016 | Rambo |
| 2016/0312614 A1 | 10/2016 | Kinstler |
| 2016/0339661 A1* | 11/2016 | Jones ................ B64C 27/473 |
| 2017/0291214 A1 | 10/2017 | Roberge |

FOREIGN PATENT DOCUMENTS

| | | | | |
|---|---|---|---|---|
| GB | 2194552 A | * | 3/1988 | ............... C25D 1/02 |
| GB | 2194552 A1 | | 3/1988 | |

\* cited by examiner

BEFORE SPINNING

FIG. 9A

AFTER SPINNING

FIG. 9B

DUCT ASSEMBLY AND METHOD OF FORMING

BACKGROUND

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine stages, also including multiple pairs of rotating blades and stationary vanes.

Duct assemblies are generally provided about the turbine engine and include conduits for providing the flow of various operating fluids to and from the turbine engine, between stages of the turbine engine, or within a fan case in the turbine engine. For example, bleed air from the turbine engine can be utilized in various ways, including providing pressure for the aircraft cabin, or keeping components of the aircraft free of ice.

BRIEF DESCRIPTION

In one aspect, the disclosure relates to a method of forming a tubular element. The method includes providing an attachment joint, disposing a sacrificial mandrel adjacent the attachment joint, where the sacrificial mandrel includes an outer surface, depositing metal on the outer surface of the sacrificial mandrel and the attachment joint to define a metallic tubular element with integral attachment joint and where depositing metal occurs at a temperature that does not damage the sacrificial mandrel, and removing the sacrificial mandrel from the metallic tubular element.

In another aspect, the disclosure relates to a duct assembly. The duct assembly includes an attachment joint and a duct section comprising a metal layer forming an exterior surface, the duct section defining a fluid passageway, and where the metal layer is unitarily formed with the attachment joint.

In yet another aspect, the disclosure relates to an aircraft engine including a fan section, a combustion section, a turbine section, and a duct assembly. The duct assembly includes an attachment joint and a duct section comprising a metal layer forming an exterior surface, the duct section defining a fluid passageway, and where the metal layer is unitarily formed with the attachment joint and wherein the attachment joint is configured to mount the duct body to a portion of the aircraft engine and wherein the metal tubular element is configured to convey fluid from a first portion of an aircraft engine to another portion of the aircraft engine.

DETAILED DESCRIPTION

Aspects of present disclosure relate to a duct assembly or conduit for providing a flow of fluid from one portion of an engine to another. A duct in the assembly can include an integrally-formed or unitarily-formed attachment joint which can be utilized to couple the duct to a portion of the engine. For purposes of illustration, the present disclosure will be described with respect to a gas turbine engine. Gas turbine engines have been used for land and nautical locomotion and power generation, but are most commonly used for aeronautical applications such as for airplanes, including helicopters. In airplanes, gas turbine engines are used for propulsion of the aircraft. It will be understood, however, that the disclosure is not so limited and can have general applicability in non-aircraft applications, such as other mobile applications and non-mobile industrial, commercial, and residential applications.

As used herein "a set" can include any number of the respectively described elements, including only one element. Additionally, all directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the present disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. In addition, as used herein, being "flush" with a given surface will refer to being level with, or tangential to, that surface.

The exemplary drawings are for purposes of illustration only and the dimensions, positions, order and relative sizes reflected in the drawings attached hereto can vary.

Figure 1:
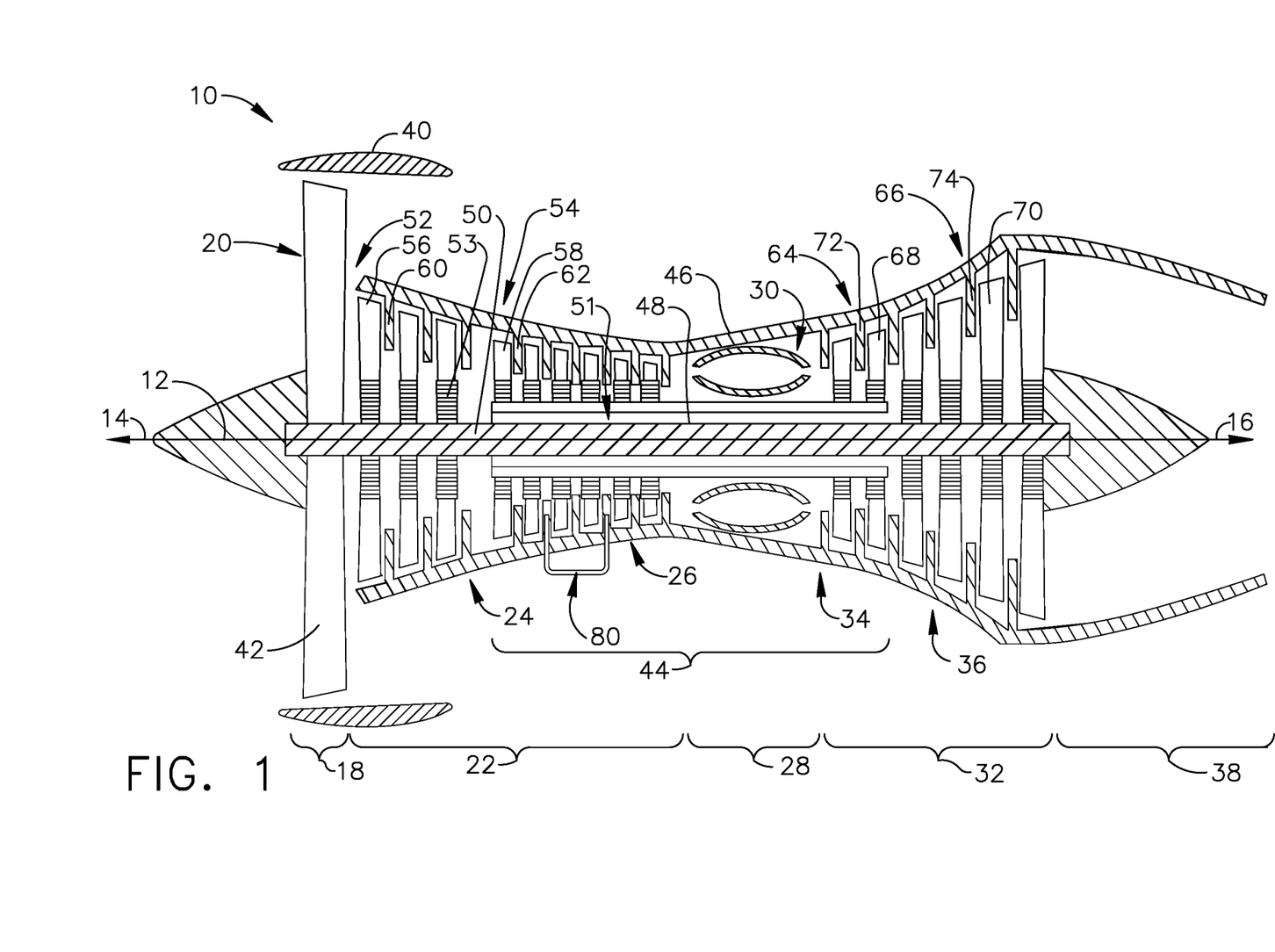
FIG. 1 is a schematic cross-sectional view of a gas turbine engine with a duct assembly in accordance with various aspects described herein.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with stages having their own disks. The vanes 60, 62 are mounted to the core casing 46 in a circumferential arrangement about the rotor 51.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more duct assemblies 80, and be used for cooling of portions, especially hot portions, such as the HP turbine 34, or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

Additionally, the ducts, or metal tubular elements thereof, can also be a fluid delivery system for routing a fluid through the engine 10, including through the duct assemblies 80. The duct assemblies 80, such as air duct or other ducting assemblies leading either internally to other portions of the turbine engine 10 or externally of the turbine engine 10, can also include one or more metal tubular elements or metallic tubular elements forming ducts or conduits configured to convey fluid from a first portion of the engine 10 to another portion of the engine 10.

Figure 2:
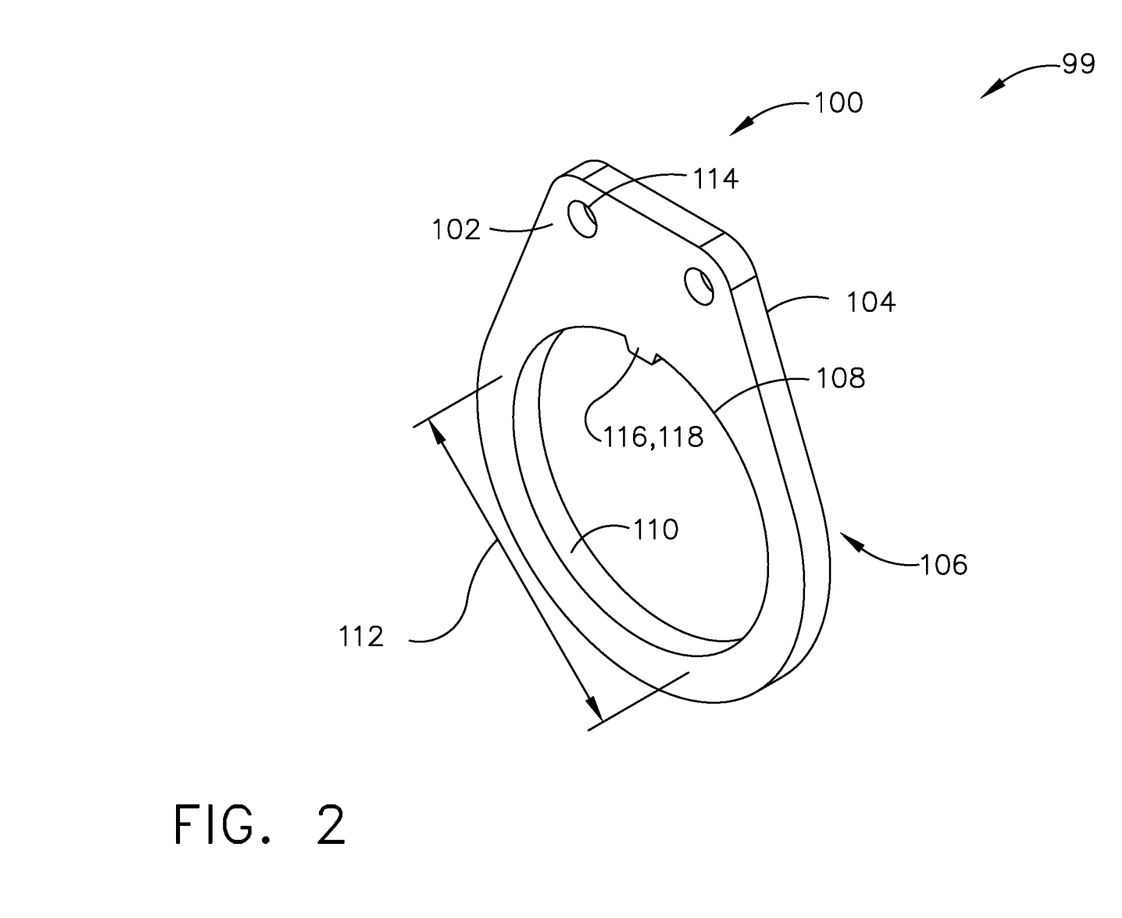
FIG. 2 illustrates a perspective view of a bracket which can be utilized in the duct assembly of FIG. 1.

Turning to FIG. 2, an exemplary attachment joint 99 is illustrated that can be utilized in the duct assembly 80 of FIG. 1. The attachment joint 99 can take any suitable form utilized for positioning, attaching, or otherwise locating, a portion of the duct assembly 80. In the non-limiting example, the attachment joint 99 is illustrated in the form of a bracket 100. The bracket 100 can be made of any suitable material for the environment, including, but not limited to, nickel, steel, or aluminum alloys. The bracket 100 can be formed in a variety of methods, including stamped, laser-cut, machined, or machine casting, in non-limiting examples.

The bracket 100 can include a body having a first surface 102 spaced from a second surface 104. A collar section 106 includes a central aperture 108 extending between the first and second surfaces 102, 104 to define an inner surface 110 as shown. The central aperture 108 can define aperture width 112. While the central aperture 108 is illustrated as substantially circular it will be understood that other profiles may also be utilized such as square, rounded, or irregular. The bracket 100 can also include other secondary apertures 114 that can be configured to receive fasteners such as bolts or rivets; it is contemplated that the bracket 100 can be configured to attach or otherwise fasten to a portion of the aircraft engine 10 of FIG. 1. In addition, any portion of the bracket 100 such as the first surface 102, second surface 104, or inner surface 110 can also include features (not shown) such as radii, ridges, protrusions, or surface roughness as desired. The bracket 100 can also include a first coupling structure 116, which is illustrated as a locating key 118.

Figure 3:
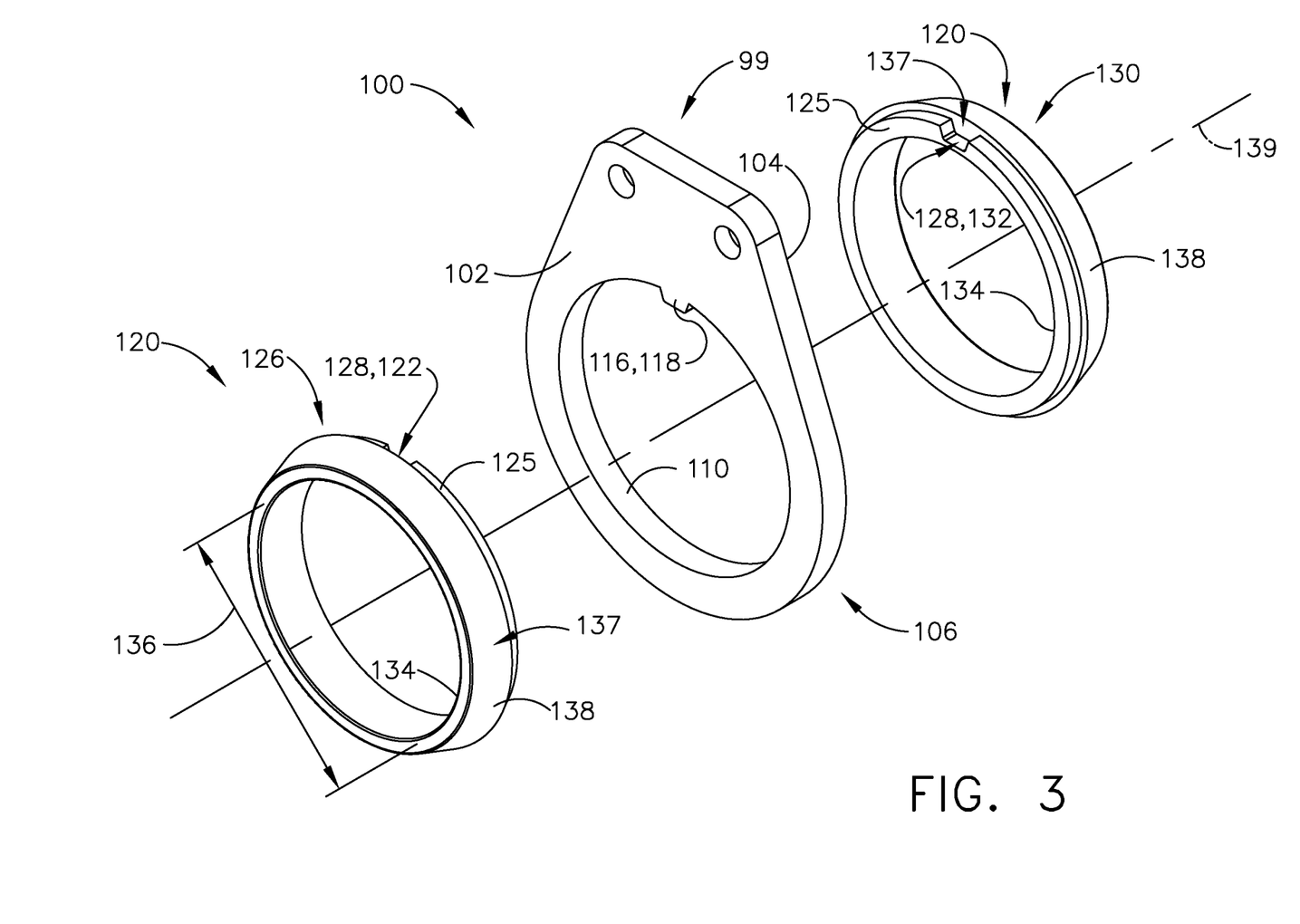
FIG. 3 is an exploded view of the bracket of FIG. 2 with a mandrel.

Turning to FIG. 3, a sacrificial mandrel 120 is illustrated in an exploded view with the bracket 100. The sacrificial mandrel 120 is utilized in forming at least a portion of the duct assembly 80. The sacrificial mandrel 120 itself can be formed via additive manufacturing, injection molding, or any other suitable process. The sacrificial mandrel 120 can include, by way of non-limiting examples, materials such as plastics/polymers, wax, or aluminum, and in any desired configuration such as solid, hollow, or foam.

The sacrificial mandrel 120 can include a first mandrel 126 configured to couple with the first surface 102 of the bracket 100, and a second mandrel 130 configured to couple with the second surface 104 of the bracket 100. While the sacrificial mandrel 120 is illustrated in two pieces as including the first and second mandrels 126, 130, it is also contemplated that the sacrificial mandrel 120 can be a single-piece mandrel, or include more than two pieces as desired. For example, in a non-limiting example where the sacrificial mandrel is injection-molded, it can be formed as a single-piece mandrel. More specifically, the bracket can be positioned in an injection mold, and the mold can be filled with material to form a single-piece sacrificial mandrel.

The first and second mandrels 126, 130 can each have a mandrel aperture 134 with a mandrel aperture width 136 which is illustrated as being substantially equal to that of the central aperture width 112 (FIG. 2). It is alternatively contemplated that the mandrel aperture width can be larger or smaller than the central aperture width 112. Furthermore, each of the first and second mandrels 126, 130 can further include an insertable step 125 and a forming portion 137 having a transitional outer surface 138 with a predetermined geometry, illustrated as being rounded in the example of FIG. 3. Other non-limiting examples of forming portion 137 geometries include square, rounded rectangular, or irregular. The outer surface 138 can be positioned adjacent the step 125. Furthermore, the bracket 100 can also include a transitional surface in place of, or in concert with, the transitional outer surface 138 of the sacrificial mandrel 120 as will be described below.

The sacrificial mandrel 120 can further include a second coupling structure 122. The second coupling structure 122 can be complementary to the first coupling structure 116. In the non-limiting example, the second coupling structure 122 is illustrated in the form of a keyway having a complementary geometry with the key 118. More specifically, the first mandrel 126 can include a first keyway 128, and the second mandrel 130 can include a second keyway 132. Each of the first and second keyways 128, 132 can be positioned on the insertable steps 125 and can also be complementary to at least a portion of the key 118. Other coupling structures 116, 122 are contemplated for use in the duct assembly 80 including, but not limited to, a strike and catch, dovetail, or threaded portions.

Figure 4:
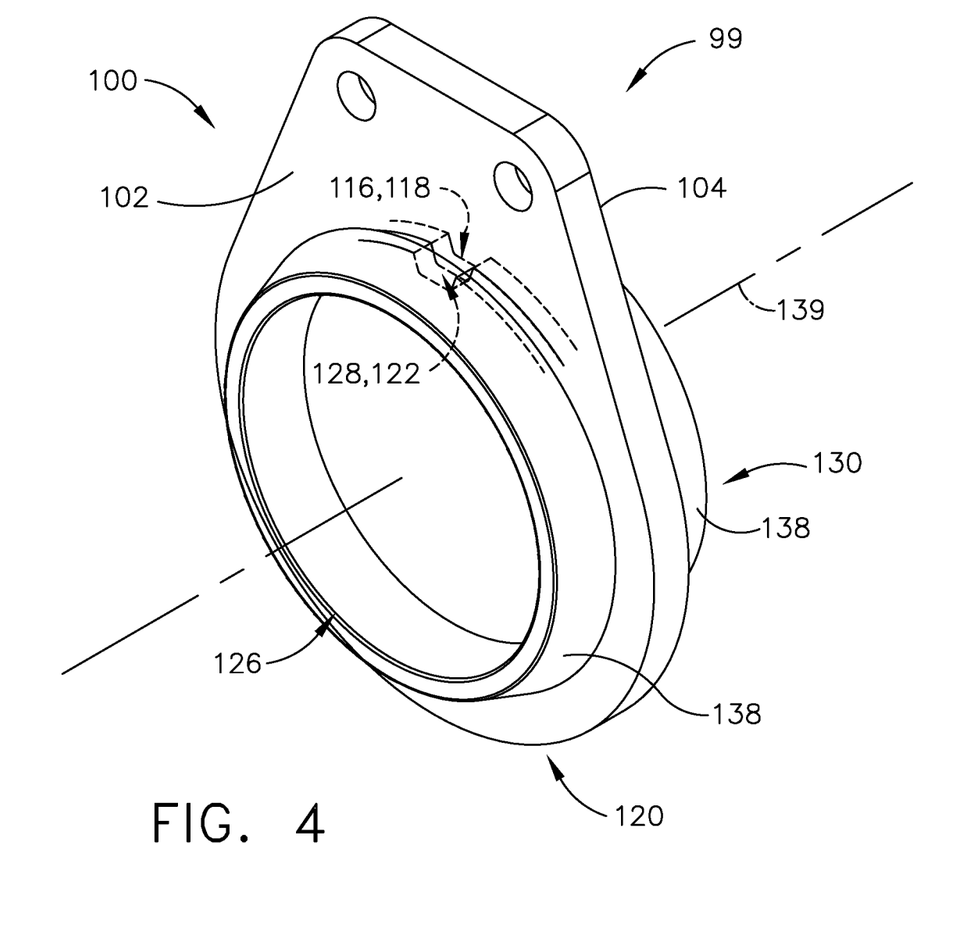
FIG. 4 is an assembled view of the bracket and mandrel of FIG. 3.

FIG. 4 illustrates the bracket 100 and sacrificial mandrel 120 assembled together. When assembled, the step 125 of the first mandrel 126 can be disposed within the collar section 106 adjacent the first surface 102, with the forming portion 137 abutting the first surface 102 and with the first keyway 128 coupled to the key 118. The step 125 of the second mandrel 130 can also be disposed within the collar section 106 adjacent the second surface 104, with the forming portion 137 abutting the second surface 104 and with the second keyway 132 coupled to the key 118. For clarity, the coupled first keyway 128 and key 118 are illustrated in phantom, with it being understood the second keyway 132 can couple to the key 118 in a similar manner.

The transitional outer surfaces 138 can be flush with or tangential to the first and second surfaces 102, 104 to provide a smooth surface transition between the sacrificial mandrel 120 and the bracket 100. Thus, the sacrificial mandrel 120 can surround the bracket 100. Each of the mandrel apertures 134 and central aperture 108 (FIG. 3) can be in registry with one another and have a common centerline 139. It is also contemplated that the sacrificial mandrel 120 can be coupled to the bracket 100 by way of adhesive. For example, the first and second keyways 128, 132 can be coupled with the key 118, and the first and second mandrels 126, 130 can be adhered to the respective first and second sides 102, 104 of the bracket 100.

Figure 5:
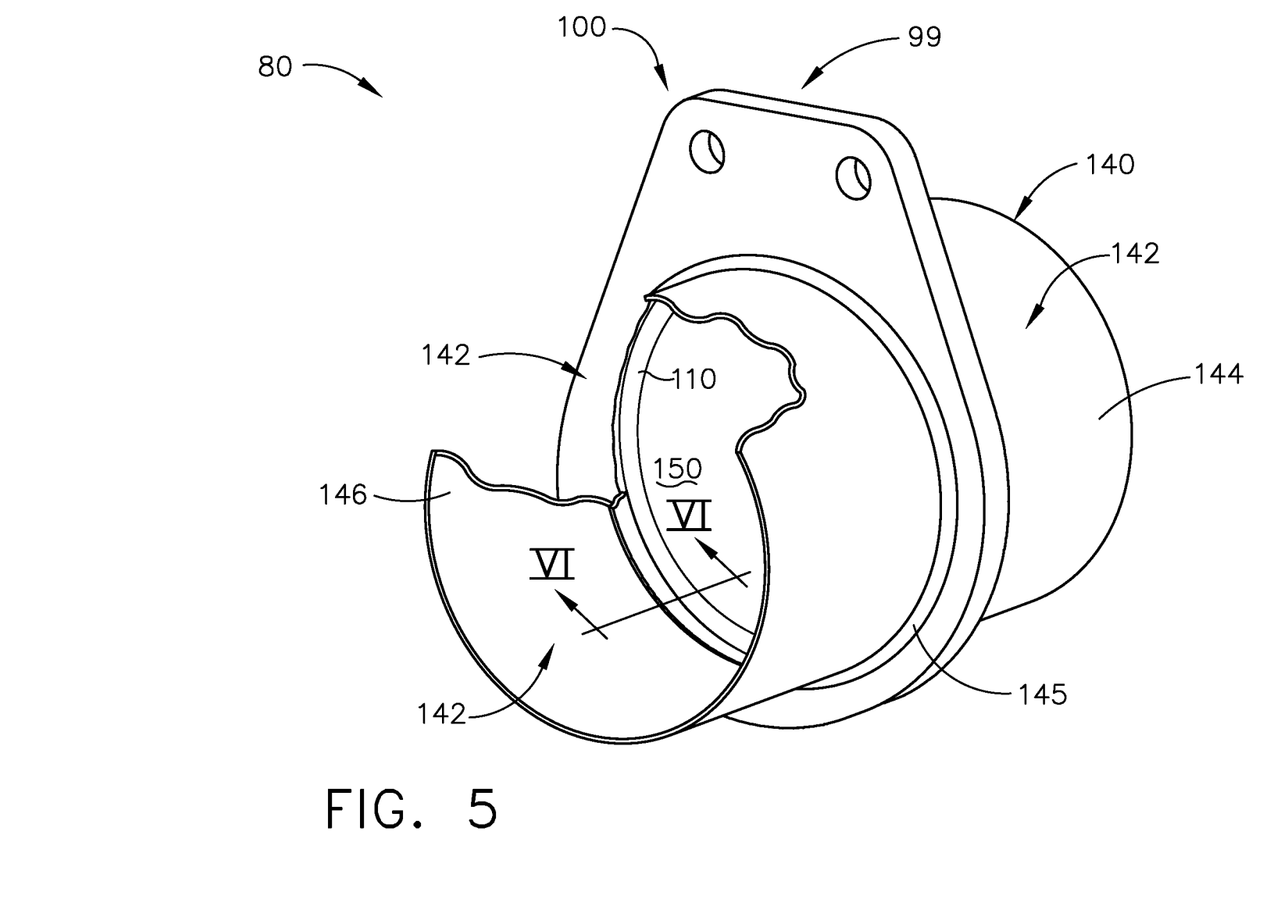
FIG. 5 illustrates a partial-cutaway perspective view of the bracket of FIG. 2 formed with a tubular element to form the duct assembly of FIG. 1.

A metal layer 142 (FIG. 5) can be deposited on exposed surfaces of the bracket 100 and exposed outer portions of the sacrificial mandrel 120 to form a duct section 140 (FIG. 5). The bracket 100 and duct section 140 form an integral monolithic body that forms a portion of the duct assembly 80 of FIG. 1. It is contemplated in one example that the metal layer 142 can be deposited, including by way of electroforming (also referred to herein as "electrodeposited") the metal layer 142 to fully cover all outer exposed surfaces of the bracket 100 as well as the outer surface 138 of the sacrificial mandrel 120. In another non-limiting example, the metal layer 142 can cover only a portion of the exposed first and second surfaces 102, 104 of the bracket 100 (FIG. 3). In this manner, an outer surface of the attachment joint 99, such as the first or second surface 102, 104 of the bracket 100, can be fully enclosed by the metal layer 142 to define a metallic tubular element such as the duct assembly 80 unitarily formed with the attachment joint 99. Furthermore, in still another example the metal layer can cover only a portion of an exposed outer surface of the sacrificial mandrel.

FIG. 5 illustrates the duct assembly 80 with the sacrificial mandrel 120 removed. The duct assembly 80 can include a duct section 140 having a metal layer 142 forming an exterior surface 144 and an interior surface 146. The metal layer 142 can be formed with curved portions 145 due to the forming portions 137 (FIG. 3) of the sacrificial mandrel 120. The sacrificial mandrel 120 can then be removed, or "sacrificed," from the duct assembly 80, including by way of melting, such as through application of heat to the mandrel 120, or by dissolving, e.g. a chemical dissolving process, in non-limiting examples.

A fluid passageway 150 can be defined within the duct assembly 80. It can be appreciated that the inner surface 110 of the collar section 106 can remain exposed with no metallic layer formed thereon, such that the inner surface 110 forms a portion of the fluid passageway 150. For example, the inner surface 110 can be disposed between adjacent curved portions 145 of the metal layer 142 as illustrated.

Figure 6:
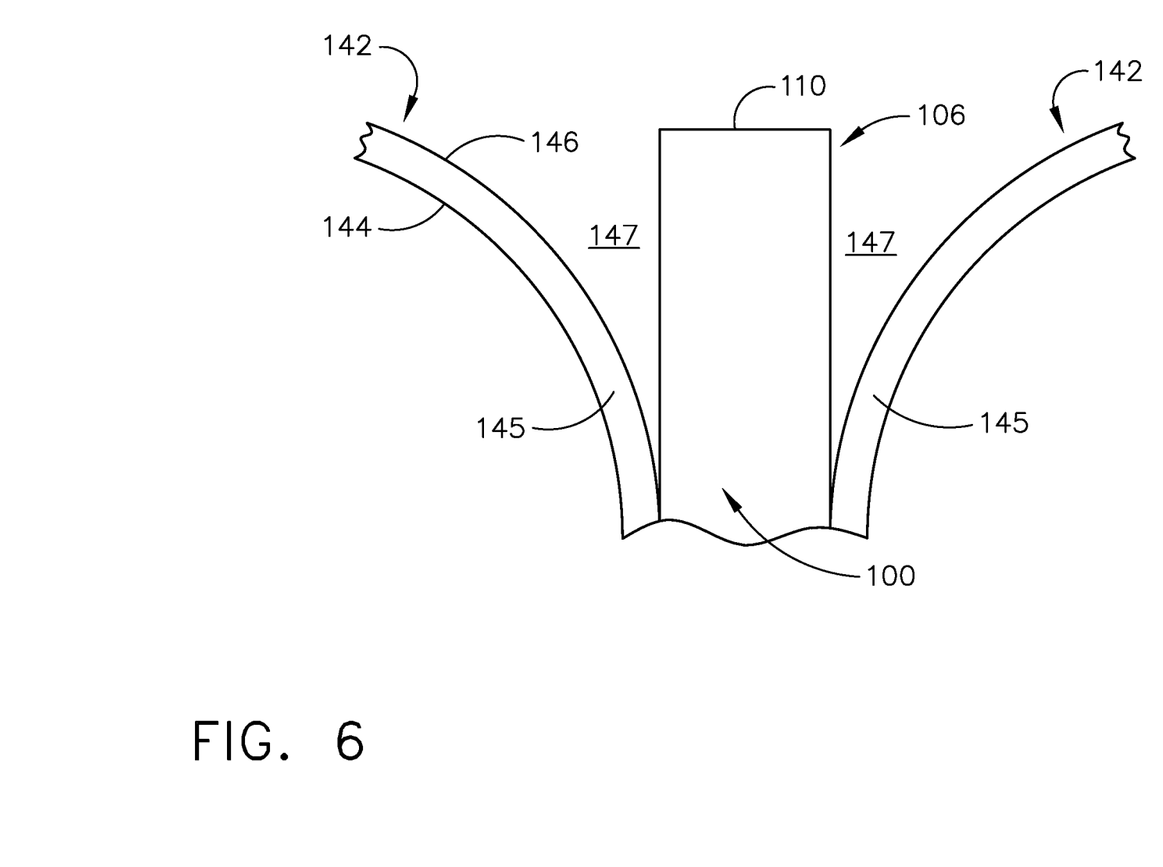
FIG. 6 is a cross-sectional view of a portion of the duct assembly illustrated in FIG. 5 along the line VI-VI.

A cross-sectional view of the duct assembly 80 along the line VI-VI is shown in FIG. 6. It is contemplated that a gap 147 can be formed between the bracket 100 and a curved portion 145 of the metal layer 142. The size or shape of the gap 147 can be tailored to the environment, e.g. decreasing the size of the gap 147 based on a temperature or pressure of fluid that would flow through the duct assembly 80. In yet another non-limiting example, the inner surface 110 of the collar section 106 can be flush with the interior surface 146 of the metal layer 142 with no gap formed therebetween. In this manner, the attachment joint 99 (e.g. the bracket 100) can include the collar section 106 encircling a portion of the fluid passageway 150 (FIG. 5) as illustrated. In still another example, the inner surface 110 of the collar section 106 can be pre-plated with a metallic layer before electroforming the metal layer 142 to form the duct assembly 80. Other examples in the spirit of the present disclosure are contemplated for use.

It can be appreciated that the attachment joint 99 can be configured to mount the duct assembly 80 to a portion of the engine 10 of FIG. 1, including by way of direct attachment of the attachment joint 99 to the engine 10. Furthermore, the duct assembly 80 can also be configured to attach to a portion of the aircraft engine 10 of FIG. 1; in this manner, either or both of the attachment joint 99 or the duct assembly 80 can attach, mount, or be coupled to the engine 10 as desired.

During operation of the engine 10 of FIG. 1, the duct assembly 80 can move or shift which generates internal stresses. Interfaces between components, such as the interface between the bracket 100 and metal layer 142, can cause local stresses to increase at that location. The unitarily-formed duct assembly 80 and bracket 100, including the transitional surfaces 152, can redirect stresses away from the interface between the duct section 140 and bracket 100 while maintaining integrity of the conduit (e.g. maintaining pressure or fluid flow within the duct section 140).

Figure 7:
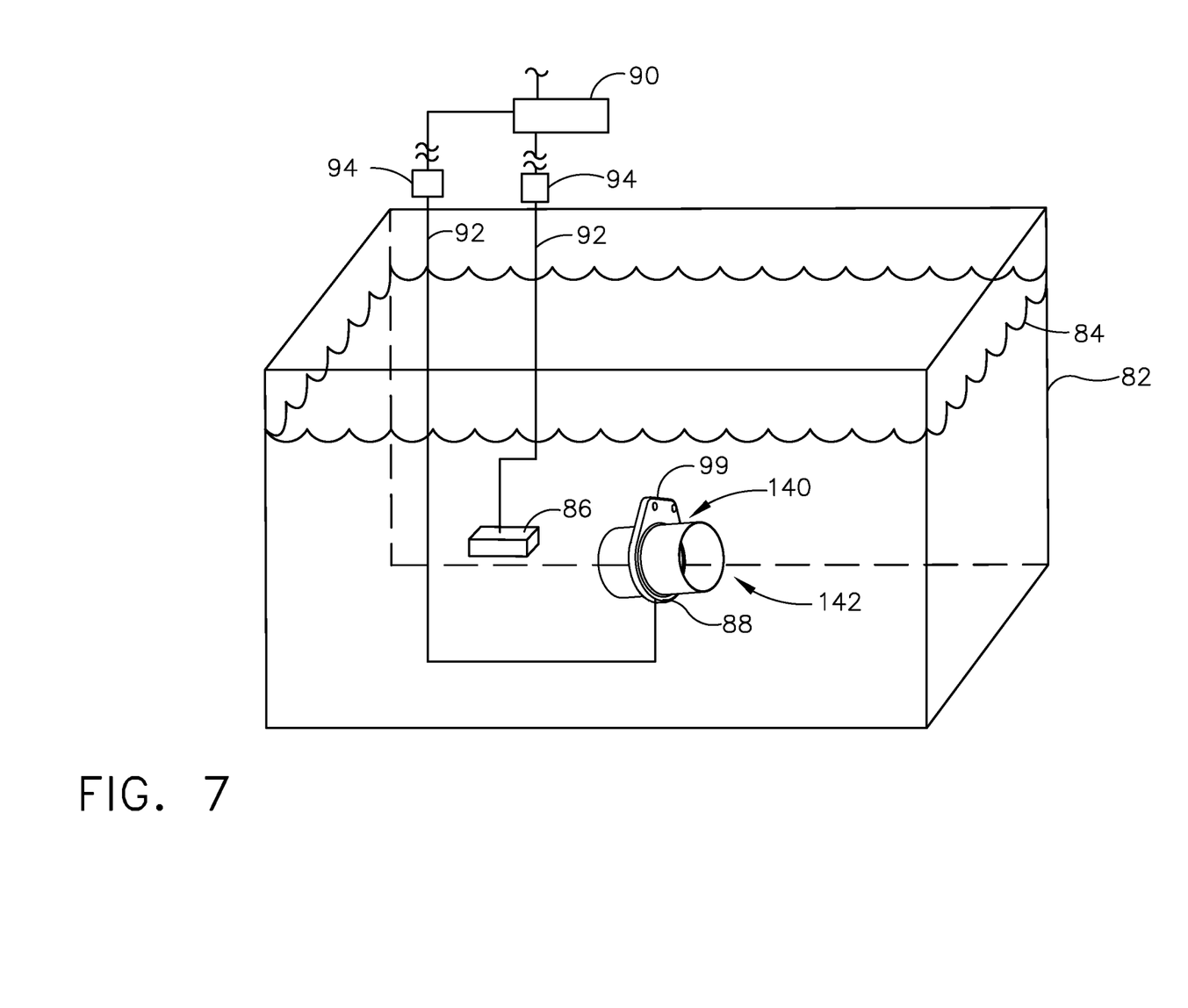
FIG. 7 schematically illustrates an electroforming bath for forming the tubular element of FIG. 5.

The electroforming process is illustrated by way of an electrodeposition bath in FIG. 7. An exemplary bath tank 82 carries a single metal constituent solution 84. The single metal constituent solution 84, in one non-limiting example, can include nickel alloy carrying alloying cobalt metal ions.

An anode 86 spaced from a cathode 88 is provided in the bath tank 82. The anodes 86 can be sacrificial anodes or an inert anode. While one anode is shown, it should be understood that the bath tank 82 can include any number of anodes 86 as desired. The duct assembly 80 can form the cathode 88, having electrically conductive material. It is also contemplated that a conductive spray or similar treatment can be provided to the duct assembly 80 to facilitate formation of the cathode 88. In addition, while illustrated as one cathode 88, it should be appreciated that one or more cathodes are contemplated for use in the bath tank 82.

A controller 90, which can include a power supply, can electrically couple to the anode 86 and the cathode 88 by electrical conduits 92 to form a circuit via the conductive metal constituent solution 84. Optionally, a switch 94 or sub-controller can be included along the electrical conduits 92, between the controller 90 and the anodes 86 and cathode 88. During operation, a current can be supplied from the anode 86 to the cathode 88 to electroform a monolithic body at the attachment joint 99 and sacrificial mandrel 120. During supply of the current, nickel and cobalt from the single metal constituent solution 84 form a nickel-cobalt metallic layer, such as the metal layer 142 described in FIG. 4, over the attachment joint 99 and sacrificial mandrel 120 to form the duct section 140.

Figure 8:
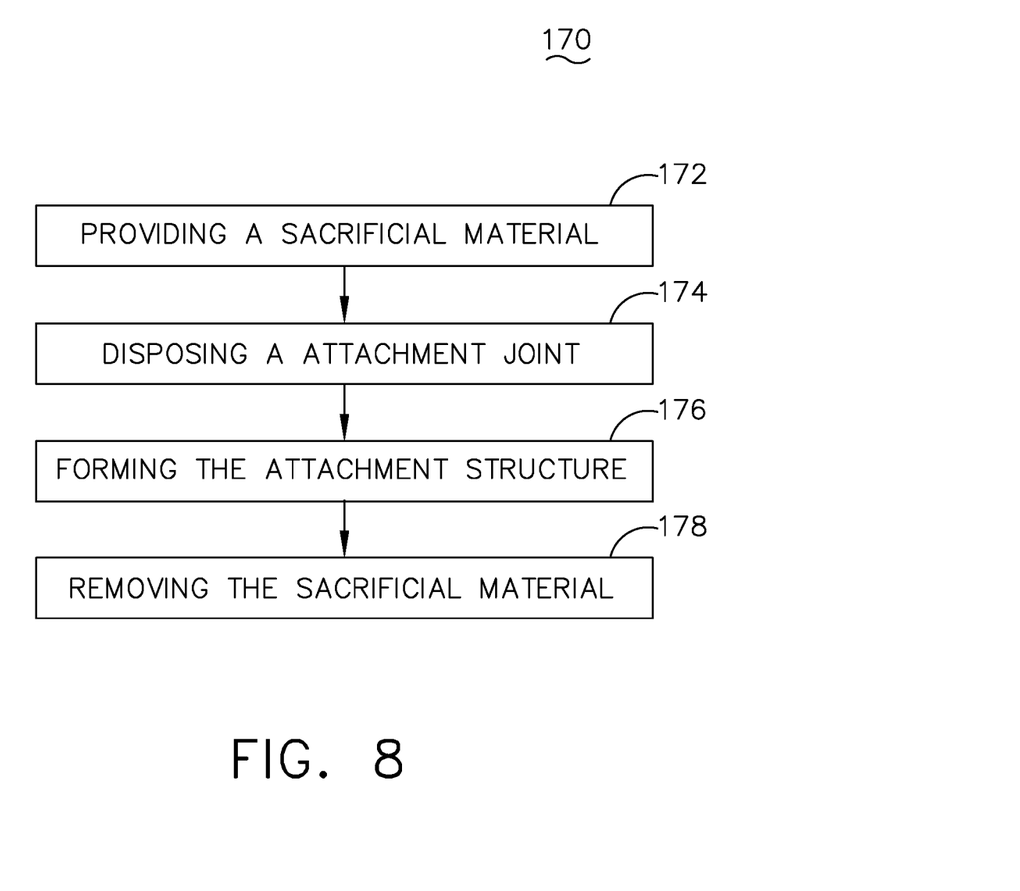
FIG. 8 is a flowchart diagram illustrating a method of forming the tubular element of FIG. 5.

FIG. 8 illustrates a method 170 of forming the metallic tubular element such as the duct assembly 80. At 172 a sacrificial material can be provided, such as the sacrificial mandrel 120 as described in FIG. 3. At 174 the sacrificial mandrel 120 can be disposed adjacent the attachment joint 99, where the sacrificial mandrel 120 includes the outer surface 138. The first coupling structure 116 (e.g. the key 118) can be mated, coupled, enmeshed with, or otherwise attached to the second coupling structure 122 (e.g. the keyways 128, 132). The coupling structures 116, 122 can be utilized to ensure a desired orientation of the sacrificial mandrel 120 and the bracket 100. In an example where the sacrificial mandrel 120 includes an irregular or asymmetric geometrical profile, proper alignment of the mandrel 120 with the attachment joint 99 can be important for proper function of the duct assembly 80.

At 176 metal can be deposited on the outer surface 138 of the sacrificial mandrel 120 as well as the attachment joint 99 to define the metallic tubular element, such as the duct assembly 80 as described in FIG. 4. It is further contemplated that the depositing metal can occur at a temperature that does not damage the sacrificial mandrel 120, which can be made of materials such as plastics/polymers, wax, or aluminum as described in FIG. 3. In a non-limiting example wherein the sacrificial mandrel 120 is made of a wax material, the depositing metal can occur at a temperature below that of the wax material's melting point. At 178, the sacrificial mandrel 120 can be removed from the duct assembly 80, including by melting or dissolving.

Figure 9A:
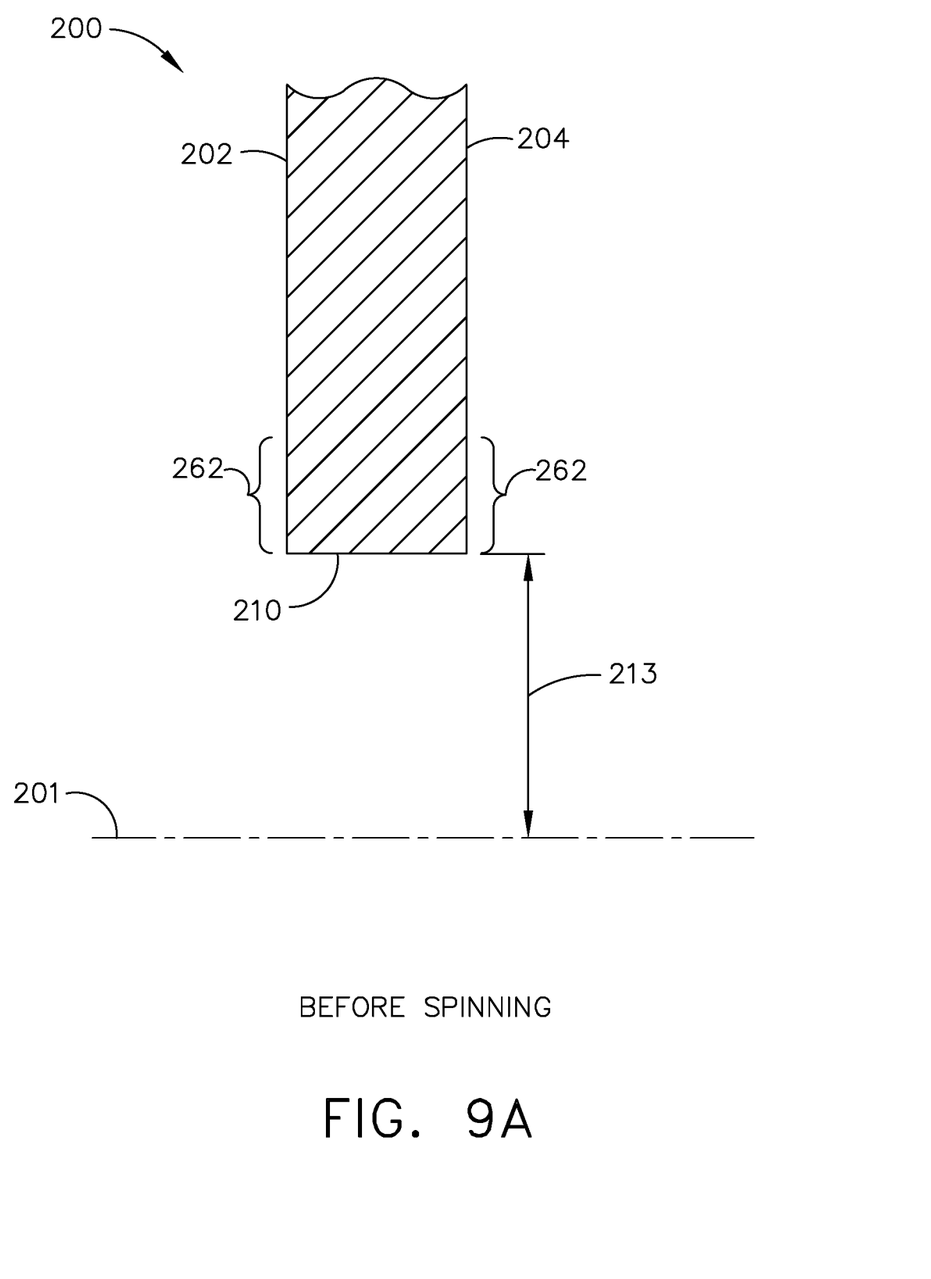
FIG. 9A is a cross-sectional view of an exemplary portion of another bracket which can be utilized in the duct assembly of FIG. 1.
Figure 9B:
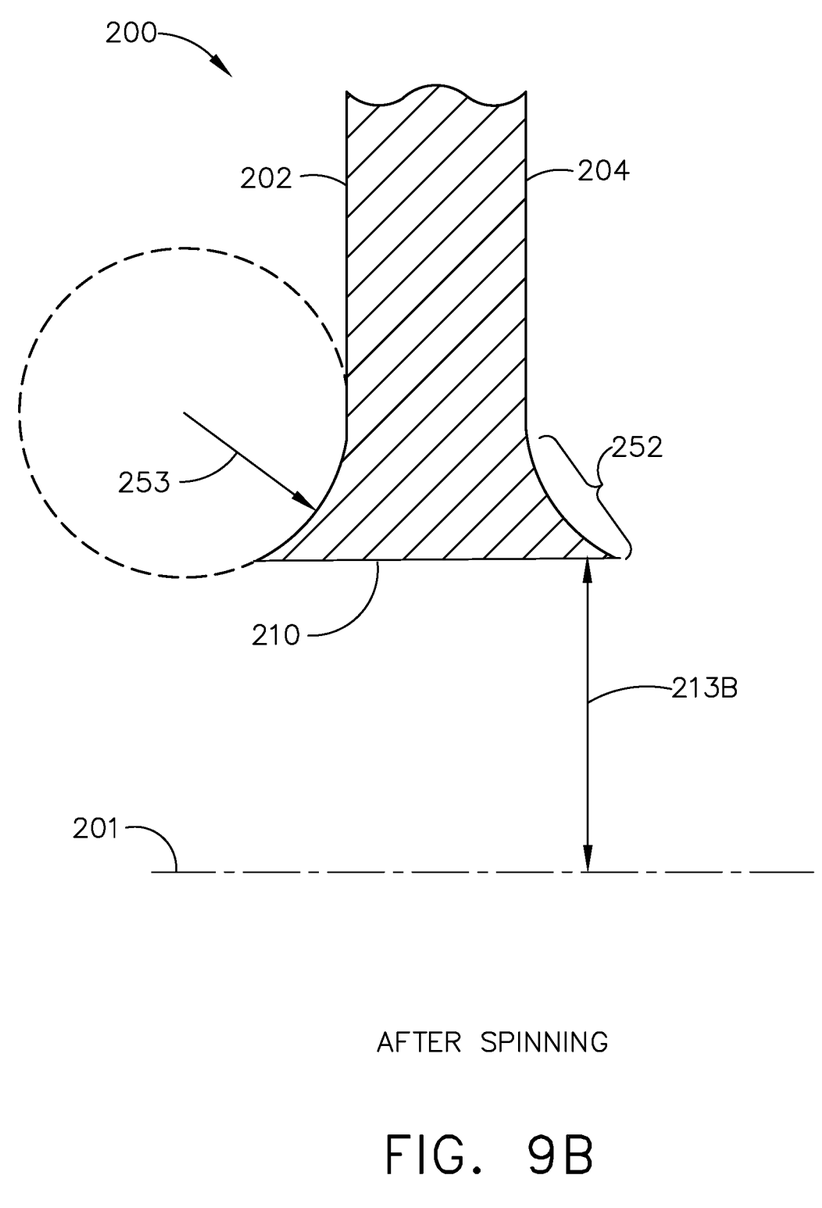
FIG. 9B illustrates the cross-sectional view of the bracket of FIG. 8A after forming a transitional surface.

Referring now to FIGS. 9A and 9B, a spinning operation is illustrated which can be utilized to form a transitional surface for another bracket 200 which can be utilized in the duct assembly 80. The bracket 200 is similar to the bracket 100; therefore, like parts will be identified with like numerals increased by 100, with it being understood that the description of the like parts of the bracket 100 applies to the bracket 200, except where noted.

In FIG. 9A, the bracket 200 is illustrated in cross-section, where an inner surface 210 is a distance 213 away from a centerline 201 similar to the centerline 101 of FIG. 3. In one example where the inner surface is circular, square, or otherwise symmetric about the centerline 201, the distance 213 can be half of a central aperture width 212 of the bracket 200.

A spinning device such as a lathe, spoon, or other rotational tool (not shown) can be utilized to spin the bracket 200 about a central axis such as the centerline 201. The bracket 200 can be clamped or otherwise held in place, and an exposed portion 262 of the bracket 200 can be formed or reshaped due to the rotational motion of the spinning device, including by way of a forming block (not shown) placed adjacent the exposed portion 262.

FIG. 9B illustrates the bracket 200 after completion of the spinning operation. The exposed portions 262 can be reshaped with transitional radii 253 due to rotational forces experienced during the spinning operation, resulting in formation of transitional surfaces 252 along a side of the bracket 200 that interfaces with the sacrificial mandrel 120, including a first surface 202 or a second surface 204. The transitional surfaces 252 can be formed or created in a variety of ways, including by casting or machining in non-limiting examples. The transitional surfaces 252 can aid in depositing the metal layer 142 smoothly over the interface between the attachment joint 99 and the sacrificial mandrel 120. In addition, the transitional surface 252 can also be referred to in the art as a "knife edge radius." The tapering of the body forming the first or second surface 202, 204 allows the metal layer 142 to more seamlessly be formed in the duct assembly 80. In operation, a step, ledge, or other discontinuous geometrical feature can concentrate stresses within the duct assembly 80 at that location. The smooth transition between the bracket 200 and the metal layer 142 can function to reduce stresses between the two, increasing the durability of the duct assembly 80.

In another non-limiting example, the bracket can be stamped from sheet metal with generous radii of curvature along all surface edges so as to aid in encapsulating the bracket with the electroformed metal layer. In another non-limiting example, the bracket can be machined or cast with transitional surfaces to smoothly interface with the sacrificial mandrel. In still another non-limiting example, the bracket can include transitional surfaces that provide a smooth transition with the electrodeposited metal layer. Other examples of forming a seamlessly-formed metal layer in the spirit of the present disclosure are also contemplated for use in the duct assembly.

It can be appreciated that the redistribution of material to form the transitional surfaces 252 can also widen a central aperture 208 of the bracket 200, thereby creating a post-spin distance 213B larger than the distance 213 of FIG. 9A. This widening effect can be accounted for in forming the duct assembly 80, as the central aperture 208 can widen by a pre-determined amount based on the transitional radii 253.

Aspects of the present disclosure provide for a variety of benefits. Traditional brackets which are welded/brazed to sheet metal tubular ducts can undergo large local stress increases at the interface between bracket and duct; the duct assembly of the present disclosure with tubular element unitarily formed with the bracket can reduce these local stresses or more efficiently redistribute stresses applied to the tube via the bracket. Thus the working lifetime of the duct assembly can be increased, which also decreases operational costs. The removal of a separate joining process (e.g. weld preparation, welding, finishing/grinding, or joining with hardware) also provides for cost savings during assembly and quality improvement for the completed duct assembly, and can also provide a reduction in weight. This is particularly advantageous in an aircraft environment where weight is directly tied to efficiency of the aircraft and fuel consumption. In addition, fully enclosing the bracket within the electrodeposited duct can provide additional support for the bracket to counteract or distribute stresses developed in the duct by a force applied to the bracket, which can further increase the working lifetime and durability of the duct assembly.

In addition, the strength of the joint between the tube and bracket can be controlled by both the surface area and thickness of deposited material on the bracket. The surface area can control the interfacial strength, and the thickness can control the shear strength of the deposited wall. For example, the strength of this joint can be increased as more of the bracket surface area is covered by electrodeposited material. Alternately, encapsulating the entire bracket with electroformed material can remove leakage paths and provide a durable duct assembly for high pressure environments.

To the extent not already described, the different features and structures of the various embodiments may be used in combination with each other as desired. That one feature may not be illustrated in all of the embodiments and is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a tubular element, the method comprising:
   providing an attachment joint configured to mount to a surface;
   disposing a sacrificial mandrel adjacent the attachment joint, where the sacrificial mandrel includes an outer surface;
   depositing metal on the outer surface of the sacrificial mandrel and the attachment joint to define a unitary metallic tubular element with the attachment joint and where depositing metal occurs at a temperature that does not damage the sacrificial mandrel; and
   removing the sacrificial mandrel from the metallic tubular element.

2. The method of claim 1 wherein the attachment joint is a bracket.

3. The method of claim 2 wherein providing the bracket further comprises providing a laser cut or stamped sheet metal bracket.

4. The method of claim 3, further comprising spinning via a sheet metal spinning operation to form a transitional radius along a side of the bracket that interfaces with the sacrificial mandrel.

5. The method of claim 2 wherein providing the bracket further comprises machining or machine casting a bracket to include a transitional surface on a side of the bracket that interfaces with the mandrel.

6. The method of claim 1 wherein the attachment joint is configured to mount the tubular element to a portion of an aircraft engine.

7. The method of claim 6 wherein the attachment joint includes a transitional surface on a side that interfaces with the sacrificial mandrel.

8. The method of claim 1 wherein the attachment joint includes a collar section that the sacrificial mandrel is disposed within.

9. The method of claim 8 wherein an interior of the collar section forms a portion of a fluid passageway within the tubular element.

10. The method of claim 1, further comprising forming, via additive manufacturing or injection molding, the sacrificial mandrel having the outer surface with a predetermined geometry.

11. The method of claim 1 wherein the depositing metal includes electroforming.

12. The method of claim 1 wherein the metal is nickel-cobalt.

13. The method of claim 1 wherein removing the sacrificial mandrel includes at least one of melting or dissolving the sacrificial mandrel.

14. The method of claim 1 wherein the depositing metal on the outer surface of the sacrificial mandrel and the attachment joint to define a metallic tubular element comprises fully enclosing an outer surface of the attachment joint.

15. A method of forming a tubular element, the method comprising:
   disposing a sacrificial mandrel adjacent to a bracket;
   depositing metal on the bracket and an outer surface of the sacrificial mandrel to define a unitary metallic tubular element with the bracket, where the depositing metal occurs at a temperature that does not damage the sacrificial mandrel; and
   removing the sacrificial mandrel from the metallic tubular element.

16. The method of claim 15 wherein the depositing metal comprises fully enclosing the bracket to form the unitary metallic tubular element.

17. The method of claim 15 wherein the bracket includes a collar section that the sacrificial mandrel is disposed within.

18. A method of forming a tubular element, the method comprising:

providing an attachment joint having a first side spaced from a second side;

positioning a first sacrificial mandrel adjacent the first side, with the first sacrificial mandrel having a first outer surface;

positioning a second sacrificial mandrel adjacent the second side, with the second sacrificial mandrel having a second outer surface;

depositing metal on the attachment joint, the first outer surface, and the second outer surface to define a unitary metallic tubular element with the attachment joint; and removing the first and second sacrificial mandrels from the metallic tubular element.

19. The method of claim 18 wherein the attachment joint comprises a bracket.

20. The method of claim 18 wherein the depositing metal comprises fully enclosing the attachment joint to form the unitary metallic tubular element.

\* \* \* \* \*